(12) United States Patent
Hung et al.

(10) Patent No.: US 8,138,274 B2
(45) Date of Patent: Mar. 20, 2012

(54) PROCESS FOR PREPARATION OF FLUOROSILICON POLYMER

(75) Inventors: Ming-Hong Hung, Wilmington, DE (US); Bruno Ameduri, Montpellier (FR)

(73) Assignees: Le Centre National De La Recherche Scien; Dupont Performance Elastomers LLC, Wilmington, DE (US)

(*) Notice: Subject to any disclaimer, the term of this patent is extended or adjusted under 35 U.S.C. 154(b) by 220 days.

(21) Appl. No.: 12/632,982

(22) Filed: Dec. 8, 2009

(65) Prior Publication Data

US 2011/0136999 A1 Jun. 9, 2011

(51) Int. Cl.
*C08G 77/14* (2006.01)

(52) U.S. Cl. ............ 525/474; 525/477; 528/26; 528/34; 528/36; 528/38; 528/40; 528/42

(58) Field of Classification Search ............ 525/474, 525/477; 528/26, 34, 36, 38, 40, 42
See application file for complete search history.

(56) References Cited

U.S. PATENT DOCUMENTS

| | | | |
|---|---|---|---|
| 2,637,738 A | 5/1953 | Wagner | |
| 4,243,770 A | 1/1981 | Tatemoto et al. | |
| 4,361,678 A | 11/1982 | Tatemoto et al. | |
| 4,579,965 A | 4/1986 | Kanner et al. | |
| 5,041,595 A | 8/1991 | Yang et al. | |
| 5,081,192 A | 1/1992 | Tatemoto | |
| 5,290,900 A * | 3/1994 | Kobayashi | 528/26 |
| 6,479,610 B1 * | 11/2002 | Singh et al. | 528/18 |
| 2001/0008922 A1 | 7/2001 | Abe et al. | |
| 2002/0032292 A1 | 3/2002 | Ikeda et al. | |
| 2005/0215741 A1 | 9/2005 | Ameduri et al. | |
| 2009/0105435 A1 | 4/2009 | Hung et al. | |

FOREIGN PATENT DOCUMENTS

| | | |
|---|---|---|
| EP | 0477894 B1 | 9/1998 |
| EP | 1489113 A1 | 12/2004 |
| EP | 1818345 A1 | 8/2007 |
| JP | 2004346087 | 12/2004 |
| WO | 9811146 | 3/1998 |

OTHER PUBLICATIONS

U.S. Appl. No. 12/209,302, filed Sep. 12, 2008, Hung et al.
U.S. Appl. No. 12/486,325, filed Jun. 17, 2009, Hung et al.
U.S. Appl. No. 12/504,267, filed Jul. 16, 2009, Hung et al.

* cited by examiner

*Primary Examiner* — Bernard Lipman

(57) ABSTRACT

Fluorosilicon polymers are disclosed that are prepared by a process comprising reacting a) iodinated oligomers having copolymerized units of perfluoro(methyl vinyl ether) and vinylidene fluoride or tetrafluoroethylene that contain 40-90 mole percent copolymerized units of vinylidene fluoride or tetrafluoroethylene and 10-60 mole percent copolymerized units of perfluoro(methyl vinyl ether), said oligomers having two functional endgroups and having a number average molecular weight between 1000 and 25,000 with b) a methoxyvinyl silane or an ethoxyvinyl silane to form a silicon-containing polymeric adduct that is further reacted with an acid to form a crosslinked fluorinated polymer.

13 Claims, No Drawings

PROCESS FOR PREPARATION OF FLUOROSILICON POLYMER

FIELD OF THE INVENTION

This invention relates to preparation of crosslinked fluorosilicon polymers by a process that comprises acid catalyzed hydrolysis and step growth polycondensation of silicon-containing polymeric adducts that comprise copolymerized units of a perfluoro(alkyl vinyl ether) and a monomer selected from the group consisting of vinylidene fluoride and tetrafluoroethylene.

BACKGROUND OF THE INVENTION

High molecular weight fluorinated copolymers that are made up of copolymerized units of perfluoro(methyl vinyl ether) (PMVE) and either vinylidene fluoride ($VF_2$) or tetrafluoroethylene (TFE) are known in the art and have been utilized to form vulcanized elastomer parts having relatively low glass transition temperatures (Tg), for example as disclosed in U.S. Patent Publication 2005/0215741 A1. The copolymers may be synthesized in the presence of chain transfer agents of the formula RfX, where Rf is a perfluorinated alkyl group and X is an iodine or bromine atom, thereby resulting in production of copolymers having iodine or bromine atom endgroups. It is also known to produce low molecular weight iodinated oligomers of PMVE and $VF_2$ or TFE, for example as disclosed in co-pending U.S. Patent Application Publication 2009/0105435 A1.

Fluorosilicon polymers have also been prepared using similar low molecular weight oligomers. For example, U.S. Pat. No. 5,081,192 discloses the reaction of unsaturated silicon-containing compounds of Formula I, shown below, with iodinated reactants of Formula II to form fluorinated copolymers of Formula III. Such fluorinated iodinated copolymers may be converted into polymer networks by reaction with zinc.

$$CH_2=CY-(CH_2)_n-SiR_xX_{3-x} \quad (I)$$

where X is a monovalent functional group, Y is a hydrogen atom or a lower alkyl group, R is a hydrogen atom or an inactive monovalent organic group, x is an integer of 0 to 3, and n is 0, 1, or 2

$$PC-I_m \quad (II)$$

where PC is a polymer chain and m is a positive integer which is not larger than the number of ends of the polymer chain PC.

$$PC-[CH_2CYI-(CH_2)_nSiR_xX_{3-x}]_m \quad (III)$$

Examples of suitable silicon-containing unsaturated compounds I disclosed in U.S. Pat. No. 5,081,192 include $CH_2=CHSiCl_3$, $CH_2=CHSiHCl_2$, $CH_2=CHSi(OC_2H_5)_3$, $CH_2=CHSi(OC_2H_5)_2Cl$, $CH_2=CHSi(OC_2H_5)Cl_2$ and $CH_2=C(CH_3)SiCl_3$. Examples of the polymer chain (PC) of formula II that are disclosed include homopolymers or copolymers comprising at least one ethylenically unsaturated fluorinated compound such as TFE and compounds of the formulae $C_3F_6$ and $CF=CFOR_f$, where $R_f$ is a perfluoroalkyl group having 1 to 16 carbon atoms. The polymer of formula III has a molecular weight of $5\times10^2$-$5\times10^6$. When X in formula III is a halogenated atom, the iodo group(s) present can be removed by treating iodinated oligomer III with an alcohol and an element in the II or III group of the periodic table, preferably zinc. When exposed to air, the polymer forms siloxane bonds by dehydration condensation of silanols that are formed by hydrolysis of the $SiR_xX_{3-x}$ groups, whereby the molecular weight increases and further three dimensional crosslinking occurs.

Crosslinked fluorosilicon polymer networks of the type described above are compositions having good sealing properties and low $T_g$. However, the processes disclosed in the prior art for producing such compositions are not optimal because crosslinking may occur prematurely before adequate network formation occurs. In addition, the presence of zinc in prior art polymer networks is problematic because of possible interference with some end use applications. For example, the presence of even low levels of zinc or other metals in fluoroelastomer seals used in semiconductor processing apparatus can cause contamination in parts produced using plasma etching techniques. It would be desirable to have available a process for production of two and three dimensional crosslinked networks of fluorinated polymers containing silicon wherein the polycondensation occurs by step-growth polycondensation. The resultant polymer network would then exhibit enhanced thermal and mechanical properties.

SUMMARY OF THE INVENTION

The present invention is a process for producing a crosslinked fluorinated polymer comprising the steps of:
A) providing an iodinated oligomer consisting essentially of:
  1) 40 to 90 mole percent copolymerized units of a first monomer selected from the group consisting of vinylidene fluoride and tetrafluoroethylene;
  2) 10 to 60 mole percent copolymerized units of a second monomer of the formula $CF_2=CFOR_f$ where $R_f$ is a perfluoroalkylene group of 1-5 carbon atoms;
  3) 0 to 10 mole percent copolymerized units of a comonomer selected from the group consisting of hexafluoropropylene and tetrafluoroethylene, with the proviso that said comonomer can only be tetrafluoroethylene when said first monomer is vinylidene fluoride and said comonomer can only be hexafluoropropylene when said first monomer is tetrafluoroethylene;
  4) 0 to 10 mole percent copolymerized units of a perfluoro(vinyl ether) of formula $CF_2=CFO(R_{f'}O)_n(R_{f''}O)_mR_{f'''}$ where $R_{f'}$ and $R_{f''}$ are different linear or branched perfluoroalkylene groups of 2-6 carbon atoms, m and n are independently 0-10, and $R_{f'''}$ is a perfluoroalkyl group of 1-6 carbon atoms, with the proviso that said perfluoro(vinyl ether) is different from said second monomer; and
  5) 0 to 10 mole percent copolymerized units of a functional fluorovinyl ether selected from the group consisting of a functional fluorovinyl ether selected from the group consisting of
     a) propanoic acid, 3-[1-[difluoro[(1,2,2-trifluoroethenyl)oxy]methyl]-1,2,2,2-tetrafluoroethoxy]-2,2,3,3-tetrafluoro-, methyl ester;
     b) ethanesulfonyl fluoride, 2-[1-[difluoro[(1,2,2-trifluoroethenyl)oxy]methyl]-1,2,2,2-tetrafluoroethoxy]-1,1,2,2-tetrafluoro-;
     c) 1-propanol, 3-[1-[difluoro[(trifluoroethenyl)oxy]methyl]-1,2,2,2-tetrafluoroethoxy]-2,2,3,3-tetrafluoro-;
     d) propanenitrile, 3-[1-[difluoro[(1,2,2-trifluoroethenyl)oxy]methyl]-1,2,2,2-tetrafluoroethoxy]-2,2,3,3-tetrafluoro-;
     e) hexanenitrile, 2,2,3,3,4,4,5,5,6,6-decafluoro-6-[(1,2,2-trifluoroethenyl)oxy]-;

f) propanenitrile, 2,3,3,3-tetrafluoro-2-[1,1,2,2,3,3-hexafluoro-3-[(trifluoroethenyl)oxy]propoxy]-;
g) propanamide, 3-[1-[difluoro[(1,2,2-trifluoroethenyl)oxy]methyl]-1,2,2,2-tetrafluoroethoxy]-2,2,3,3-tetrafluoro-;
h) 1-propanol, 3-[1-[difluoro[(trifluoroethenyl)oxy]methyl]-1,2,2,2-tetrafluoroethoxy]-2,2,3,3-tetrafluoro-, dihydrogen phosphate; and
i) propanoic acid, 3-[1-[difluoro[(trifluoroethenyl)oxy]methyl]-1,2,2,2-tetrafluoroethoxy]-2,2,3,3-tetrafluorowherein said iodinated oligomer has a number average molecular weight of 1000 to 25,000 g/mole and wherein said oligomer has an iodine group at each chain end;

B) contacting said iodinated oligomer with a vinyl silane of the formula $$CH_2=CY-(CH_2)_n-SiRR'R''$$

where Y is a hydrogen atom or a $C_1$-$C_3$ alkyl group, R is a methoxy or ethoxy group, and R' and R" are independently selected from the group consisting of methyl groups, methoxy groups and ethoxy groups, under conditions wherein the molar ratio of said iodinated oligomer to said vinyl silane is 1 to at least 2.5 to form a silicon-containing polymeric adduct that is a composition of the formula $$PC-[CH_2CYI-(CH_2)_nSiRR'R'']_m$$

where PC is the polymer chain of said iodinated oligomer, n is 0-2 and m is 2; and C) contacting said silicon-containing polymeric adduct with an acid to form a crosslinked fluorinated polymer.

A further embodiment of the invention is a process for producing a crosslinked fluorinated polymer comprising the steps of:

A) providing an iodinated oligomer consisting essentially of:
1) 40 to 90 mole percent copolymerized units of a first monomer selected from the group consisting of vinylidene fluoride and tetrafluoroethylene;
2) 10 to 60 mole percent copolymerized units of a second monomer of the formula $CF_2=CFOR_f$ where $R_f$ is a perfluoroalkylene group of 1-5 carbon atoms;
3) 0 to 10 mole percent copolymerized units of a comonomer selected from the group consisting of hexafluoropropylene and tetrafluoroethylene, with the proviso that said comonomer can only be tetrafluoroethylene when said first monomer is vinylidene fluoride and said third monomer can only be hexafluoropropylene when said first monomer is tetrafluoroethylene;
4) 0 to 10 mole percent copolymerized units of a perfluoro(vinyl ether) of the formula $CF_2=CFO(R_f O)_n(R_{f'}O)_m R_{f''}$ where $R_{f'}$ and $R_{f''}$ are different linear or branched perfluoroalkylene groups of 2-6 carbon atoms, m and n are independently 0-10, and $R_{f''}$ is a perfluoroalkyl group of 1-6 carbon atoms, with the proviso that said perfluoro(vinyl ether) is different from said second monomer; and
5) 0 to 10 mole percent copolymerized units of a functional fluorovinyl ether selected from the group consisting of a functional fluorovinyl ether selected from the group consisting of
a) propanoic acid, 3-[1-[difluoro[(1,2,2-trifluoroethenyl)oxy]methyl]-1,2,2,2-tetrafluoroethoxy]-2,2,3,3-tetrafluoro-, methyl ester;
b) ethanesulfonyl fluoride, 2-[1-[difluoro[(1,2,2-trifluoroethenyl)oxy]methyl]-1,2,2,2-tetrafluoroethoxy]-1,1,2,2-tetrafluoro-;
c) 1-propanol, 3-[1-[difluoro[(trifluoroethenyl)oxy]methyl]-1,2,2,2-tetrafluoroethoxy]-2,2,3,3-tetrafluoro-;
d) propanenitrile, 3-[1-[difluoro[(1,2,2-trifluoroethenyl)oxy]methyl]-1,2,2,2-tetrafluoroethoxy]-2,2,3,3-tetrafluoro-;
e) hexanenitrile, 2,2,3,3,4,4,5,5,6,6-decafluoro-6-[(1,2,2-trifluoroethenyl)oxy]-;
f) propanenitrile, 2,3,3,3-tetrafluoro-2-[1,1,2,2,3,3-hexafluoro-3-[(trifluoroethenyl)oxy]propoxy]-;
g) propanamide, 3-[1-[difluoro[(1,2,2-trifluoroethenyl)oxy]methyl]-1,2,2,2-tetrafluoroethoxy]-2,2,3,3-tetrafluoro-;
h) 1-propanol, 3-[1-[difluoro[(trifluoroethenyl)oxy]methyl]-1,2,2,2-tetrafluoroethoxy]-2,2,3,3-tetrafluoro-, dihydrogen phosphate; and
i) propanoic acid, 3-[1-[difluoro[(trifluoroethenyl)oxy]methyl]-1,2,2,2-tetrafluoroethoxy]-2,2,3,3-tetrafluorowherein said iodinated oligomer has a number average molecular weight of 1000 to 25,000 g/mole and wherein said oligomer has an iodine group at each chain end;

B) contacting said iodinated oligomer with a vinyl silane of the formula $$CH_2=CY-(CH_2)_n-SiRR'R''$$

where Y is a hydrogen atom or a $C_1$-$C_3$ alkyl group, R is a methoxy or ethoxy group, and R' and R" are independently selected from the group consisting of methyl groups, methoxy groups and ethoxy groups, under conditions wherein the molar ratio of said iodinated oligomer to said vinyl silane is 1 to at least 2.5 to form a silicon-containing polymeric adduct that is a composition of the formula $$PC-[CH_2CYI-(CH_2)_nSiRR'R'']_m$$

where PC is the polymer chain of said iodinated oligomer, n is 0-2 and m is 2;

C) contacting said silicon-containing polymeric adduct with a reducing agent to form a non-iodinated silicon-containing polymeric adduct; and D) contacting said non-iodinated silicon-containing polymeric adduct with an acid to form a crosslinked fluorinated polymer.

DETAILED DESCRIPTION OF THE INVENTION

The present invention relates to an improved process for synthesis of crosslinked silicon-containing fluorinated elastomeric polymers having low glass transition temperatures. The polymers are synthesized from difunctional iodinated oligomers that themselves typically have glass transition temperatures of less than −30° C. By "difunctional" is meant that, on average, both ends of each oligomer chain have a reactive (i.e. "functional") iodine endgroup. Because they contain reactive functional groups at each end of the oligomer chain, such difunctional iodinated oligomers may be used as reactants in syntheses of higher molecular weight polymers or polymeric adducts.

With respect to one embodiment of the process of the present invention, a difunctional iodinated (i.e. diiodinated) fluoro-oligomer is reacted with a vinyl silane of formula IV.

$$CH_2=CY-(CH_2)_n-SiRR'R'' \qquad (IV)$$

where Y is a hydrogen atom or a $C_1$-$C_3$ alkyl group, R is a methoxy or ethoxy group, and R' and R" are independently selected from the group consisting of methyl groups, methoxy groups and ethoxy groups, and the molar ratio of said diiodinated oligomer to said vinyl silane is 1 to at least 2.5, preferably 5-15, more preferably 7.5-10. The resultant iodinated silicon-containing polymeric adduct is then reacted with an acid to form a crosslinked fluorinated polymer.

In another embodiment of the process of the invention, a difunctional iodinated oligomer (i.e. a diiodinated oligomer) is contacted with a vinyl silane of formula IV above to form an iodinated silicon-containing polymeric adduct. The iodinated adduct is contacted with a reducing agent to form a non-iodinated silicon-containing polymeric adduct which is subsequently reacted with an acid to form a crosslinked fluorinated polymer.

The difunctional diiodinated oligomers (which may also be referred to as telechelic difunctional diiodinated oligomers) that may be utilized in the process of the invention have a number average molecular weight of 1000 to 25,000 g/mole and an iodine group at each end of the oligomer chain. The oligomer chain consists essentially of a) 40 to 90 (preferably 50 to 85, most preferably 60 to 75) mole percent copolymerized units of a first comonomer selected from the group consisting of vinylidene fluoride ($VF_2$); and tetrafluoroethylene (TFE); b) 10 to 60, preferably 15 to 50, most preferably 25 to 40, mole percent copolymerized units of a second fluorinated comonomer that is a perfluoro(alkyl vinyl ether), i.e. $R_fOCF=CF_2$, where $R_f$ is a perfluoroalkylene group of 1-5 carbon atoms; c) 0 to 10 mole percent copolymerized units of a fluorinated comonomer selected from the group consisting of hexafluoropropylene (HFP) and tetrafluoroethylene (TFE), with the proviso that c) can only be tetrafluoroethylene when a) is vinylidene fluoride and c) can only be hexafluoropropylene when a) is tetrafluoroethylene; d) 0 to 10 mole percent copolymerized units of a perfluoro vinyl ether of the formula $CF_2=CFO(R_fO)_n(R_{f'}O)_mR_{f''}$ where $R_{f'}$ and $R_{f''}$ are different linear or branched perfluoroalkylene groups of 2-6 carbon atoms, m and n are independently 0-10, and $R_f$ is a perfluoroalkyl group of 1-6 carbon atoms; and e) 0 to 10 mole percent copolymerized units of a functional fluorovinyl ether selected from the group consisting of i) propanoic acid, 3-[1-[difluoro[(1,2,2-trifluoroethenyl)oxy]methyl]-1,2,2,2-tetrafluoroethoxy]-2,2,3,3-tetrafluoro-, methyl ester (EVE); ii) ethanesulfonyl fluoride, 2-[1-[difluoro[(1,2,2-trifluoroethenyl)oxy]methyl]-1,2,2,2-tetrafluoroethoxy]-1,1,2,2-tetrafluoro- (PFSVE); iii) 1-propanol, 3-[1-[difluoro[(trifluoroethenyl)oxy]methyl]-1,2,2,2-tetrafluoroethoxy]-2,2,3,3-tetrafluoro- (EVE-OH); iv) propanenitrile, 3-[1-[difluoro[(1,2,2-trifluoroethenyl)oxy]methyl]-1,2,2,2-tetrafluoroethoxy]-2,2,3,3-tetrafluoro- (8-CNVE); v) hexanenitrile, 2,2,3,3,4,4,5,5,6,6-decafluoro-6-[(1,2,2-trifluoroethenyl)oxy]- (L-8-CNVE); vi) propanenitrile, 2,3,3,3-tetrafluoro-2-[1,1,2,2,3,3-hexafluoro-3-[(trifluoroethenyl)oxy]propoxy]- (iso-8-CNVE); vii) propanamide, 3-[1-[difluoro[(1,2,2-trifluoroethenyl)oxy]methyl]-1,2,2,2-tetrafluoroethoxy]-2,2,3,3-tetrafluoro- (AVE); viii) 1-propanol, 3-[1-[difluoro[(trifluoroethenyl)oxy]methyl]-1,2,2,2-tetrafluoroethoxy]-2,2,3,3-tetrafluoro-, dihydrogen phosphate (EVE-P); and ix) propanoic acid, 3-[1-[difluoro[(trifluoroethenyl)oxy]methyl]-1,2,2,2-tetrafluoroethoxy]-2,2,3,3-tetrafluoro- (EVE-COOH). Mole percent values are based on the total number of moles of copolymerized monomer units in the oligomers, the sum of the mole percents of all of the copolymerized monomer units being 100 mole percent. When present, the perfluoro (vinyl ether) of d) will be different, i.e. chemically distinct, from the second monomer, by which is meant that the molecular weights of the two perfluoro(vinyl) ethers will be different.

A preferred class of perfluoro (vinyl ether) that may be employed as the second comonomer or the optional additional perfluoro(vinyl ether) comonomer includes compositions of the formula $$CF_2=CFO(CF_2CFXO)_nR_f$$

where X is F or $CF_3$, n is 0-5, and $R_f$ is a perfluoroalkyl group of 1-6 carbon atoms.

The second monomer is a member of the above class of perfluoroalkyl(vinyl ethers) and includes those ethers wherein n is 0 and $R_f$ contains 1-3 carbon atoms. Examples of such perfluorinated ethers are perfluoro(methyl vinyl ether) (PMVE), perfluoro(ethyl vinyl ether) and perfluoro(propyl vinyl ether) (PPVE). Such comonomers may also be utilized as the optional perfluoro(ethyl vinyl) ether comonomer of d). For example, the second monomer may be perfluoro(methyl vinyl) ether and the optional additional perfluoro(vinyl ether) may be perfluoro(propyl vinyl) ether.

Useful perfluoro vinyl ethers that may be employed as the optional additional perfluoro(vinyl ether) include compositions of the formula $$CF_2=CFO[(CF_2)_mCF_2CFZO]_nR_f$$

where $R_f$ is a perfluoroalkyl group having 1-6 carbon atoms, m=0 or 1, n=0-5, and Z=F or $CF_3$. Preferred members of this class are those in which $R_f$ is $CF_3$, m=1, n=1, and Z=F; and $R_f$ is $C_3F_7$, m=0, and n=1.

Additional perfluoro vinyl ethers include compounds of the formula $$CF_2=CFO[(CF_2CF\{CF_3\}O)_n(CF_2CF_2CF_2O)_m(CF_2)_p]C_xF_{2x+1}$$

where m and n independently=0-10, p=0-3, and x=1-5. Preferred members of this class include compounds where n=0-1, m=0-1, and x=1.

Other additional examples of useful perfluoro vinyl ethers include $$CF_2=CFOCF_2CF(CF_3)O(CF_2O)_mC_nF_{2n+1}$$

where n=1-5, m=1-3, and where, preferably, n=1.

The oligomers range from viscous oils to solids (for example, in some instances, the solids are gums) at room temperature and have a number average molecular weight of 1000 to 25,000; preferably 1200 to 12,000; most preferably 1500 to 5000. In addition, the oligomers have a narrow molecular weight distribution, i.e. less than 1.5, preferably less than 1.2.

The oligomers may be synthesized by a solution, suspension or emulsion polymerization process. Such processes are well known in the art. Preferably, an emulsion process is employed wherein an inorganic peroxide (e.g. sodium or ammonium persulfate) is the initiator. Optionally a surfactant, particularly a fluorosurfactant, may be included in order to improve the stability of the emulsion.

The polymerization reaction is conducted in the presence of a chain transfer agent of the formula I—Rf—I, wherein Rf is a perfluoroalkylene or an oxygen atom-containing perfluoroalkylene group containing between 3 and 12 carbon atoms. The preferred chain transfer agents are 1,2-diiodoperfluoroethane, 1,4-diiodoperfluorobutane and 1,6-diiodoperfluorohexane and may be a mixture of diiodoperfluoroalkanes. The chain transfer agent is typically introduced to the reactor prior to initiation of the polymerization reaction and is present at a sufficient level so as to result in production of oligomers having an iodine atom endgroup at each end of the oligomer chains. Typically, about 4-12 mol %, preferably 5-10 mol %, based on the total molar amounts of monomer, of chain transfer agent is utilized. NMR spectroscopy may be used to confirm that, on average, two iodine atoms are present on each polymer chain.

Specific examples of iodinated oligomers that may be used in the process of the invention include, but are not limited to I—(VF2-co-PMVE)-I; I—CH2CH2-(VF2-co-PMVE)-CH$_2$CH$_2$—I; I-(TFE-co-PMVE)-I; I—CH2CH$_2$-(TFE-co-PMVE)-CH$_2$CH$_2$—I; I-(TFE-co-PMVE-co-HFP)—I; I—CH$_2$CH$_2$-(TFE-co-PMVE-co-HFP)—CH$_2$CH$_2$—I; I-(TFE-co-PMVE-co-VF$_2$)—I; and I—CH$_2$CH$_2$-(TFE-co-PMVE-co-VF$_2$)—CH$_2$CH$_2$—I. The designation "-co-" indicates that the monomers listed are copolymerized units that form part of the polymer backbone chain. The copolymerized units are distributed in a random, or statistical, order along the polymer chain.

According to the process of the present invention, the telechelic difunctional iodinated oligomers are contacted with a vinyl alkoxysilane of the formula

$$CH_2=CY-(CH_2)_n-SiRR'R''$$

where Y is a hydrogen atom or a $C_1$-$C_3$ alkyl group, R is a methoxy or ethoxy group, and R' and R" are independently selected from the group consisting of $C_1$-$C_6$ alkyl and alkoxy groups. Preferred species include methyl groups, methoxy groups and ethoxy groups. The molar ratio of telechelic diiodinated oligomer to the vinyl silane is 1 to at least 2.5. The diiodinated oligomers and the silanes react to form an iodinated silicon-containing polymeric adduct.

Vinyl alkoxysilanes may be prepared by catalyzed hydrosilylation reactions of alkoxysilanes and acetylene. Another approach involves reaction of vinylchlorosilane with an alcohol. Methods of preparation are described in U.S. Pat. Nos. 2,637,738; 4,579,965; 5,041,595 and European Patent 477894. Vinyl alkoxysilanes are also commercially available, for example from Sigma-Aldrich Co. and Gelest Inc.

These compounds are well known in the art and include, but are not limited to vinyl triethoxy silane, vinyl dimethylmethoxy silane, vinyl dimethylethoxy silane, vinyl methyl dimethoxy silane, vinyl methyldiethoxy silane, vinyl ethyl diethoxysilane and vinyl trimethoxysilane. Most preferably, the silane is vinyl triethoxysilane or vinyl trimethoxysilane because the compounds readily react with the difunctional iodinated oligomers (i.e. telechelic diiodinated oligomers) to form adducts that may be further converted to three dimensional polymer networks.

The reaction of the difunctional iodinated oligomers and the vinyl silane is typically carried out at a temperature of 40° C. to 180° C., preferably 50° C. to 140° C., in a solvent. Suitable solvents include, but are not limited to acetonitrile, tetrahydrofuran, butyronitrile, ethyl acetate, methyl ethyl ketone and dioxane. A free radical initiator is present in the reaction mixture. Suitable radical generating compounds include t-butyperoxypivalate, t-amylperoxypivalate, di-t-butylperoxide, azobisisobutyonitrile, hydrogen peroxide, benzoyl peroxide, t-butyl cyclohexyl peroxydicarbonate, and 2,5-bis-(t-butylperoxy)-2,5-dimethylhexane. The vinyl alkoxysilane should be present in an amount of at least 1.5 equivalents per equivalent of iodine in the diiodinated (i.e. difunctional or telechelic) oligomer reactant. Preferably, the amount of vinyl alkoxysilane will be present in an amount of from 2.0 to 5.0 equivalents per equivalent of iodine in the iodinated difunctional oligomer reactant. The reaction is preferably conducted in an inert atmosphere to reduce the inhibition period caused by the presence of oxygen, which is a radical scavenger The reaction product obtained is a polymeric silicon-containing adduct that is a telechelic.-diiodinated silylated fluorooligomer having alkoxysilane endgroups. That is, the reaction product is a difunctional, diiodinated, silylated fluorooligomer.

In one embodiment of the invention, the polymeric silicon-containing adduct is utilized without further treatment as a starting material to form a crosslinked fluorinated polymer. That is, the silicon-containing adduct is hydrolyzed in an acid catalyzed reaction which results in hydrolysis of the alkoxysilane endgroups present in the adduct with formation of SiOH endgroups. These endgroups then react to form a high molecular weight network structure. The network is formed by a chemical crosslinking reaction wherein covalent bonds (i.e. the crosslinks) are formed by reaction of the polymeric adduct molecules with simultaneous elimination of alcohols. The crosslinks contain Si—O—Si groups. The product of the hydrolysis reaction is a fluorosilicon polymer that has elastomeric properties and excellent low temperature properties that are due to the $T_g$, i.e. below −35° C., of the product.

The acid catalyzed reaction may carried out at temperatures of from ambient temperature to about 120° C., generally from ambient temperature to 60° C., and may take place in an organic solvent. Suitable solvents include tetrahydrofuran, methyl ethyl ketone, dioxane, butyronitrile, ethyl acetate, dimethylformamide, and dimethyl acetamide. Acids that are suitable for use as catalysts include, but are not limited to methanesulfonic acid, triflic acid, paratoluenesulfonic acid, hydrochloric acid, nitric acid and sulfuric acid. The concentration of the acid in the solvent generally ranges from $10^{-7}$ to $10^{-1}$ moles per liter, preferably $10^{-6}$ to $5\times10^{-3}$ moles per liter. The morphology of the crosslinked network produced by the acid catalyzed crosslinking reaction will vary depending on the particular vinyl alkoxysilane utilized. For example, if a tri-substituted vinyl alkoxysilane, such as vinyl triethoxysilane, is used as a reactant to form the telechelic silylated oligomer, the network will be more highly crosslinked than if vinyl methyldimethoxysilane is utilized as a reactant to form the silylated oligomer. The particular vinyl alkoxysilane selected will depend on the particular physical properties desired in the crosslinked polymer product.

Other reagents may be added to the reaction mixture to modify the properties of the silicon-containing fluoroelastomer. For example, silicon compounds and polymers such as tetraethoxysilane, tetraethyoxydimethylsilane, tetramethyldisiloxane, hexamethyldisiloxane, tetramethyldiethoxysilane or poly(dimethylsiloxane) may be added. Alternatively, organometallic compounds of the formula $M(OR)_x$ where M stands for Al, Ti, Zr, Si and $OR=OC_nH_{2n+1}$ may be utilized as modifiers. Titanium tetra(isopropoxide), and boron tris(pentafluorobenzene) are examples of such compositions. Such compounds promote reaction of alkoxy groups thereby catalyzing hydrolysis and condensation to form the polymer network.

In another embodiment of the process of the invention the silicon-containing polymeric adduct is contacted with a reducing agent to form a non-iodinated silicon-containing polymeric adduct which is utilized as the starting material to form the crosslinked fluoropolymer product. In this embodiment, reducing agents such as tributyl tin hydride, zinc in non-protonic solvents, lithium aluminum hydride, sodium borohydride, sodium amalgams, diborane, and hydrogen over various catalysts may be utilized. The non-iodinated silicon-containing adduct may be readily prepared by contacting the iodinated silicon-contacting adduct with the selected reducing agent, such as tin hydride, in a solvent such as acetonitrile at elevated temperature, e.g. 50° C.-100° C., in the presence of a free radical generator such as azobisisobutyronitrile.

The solvent-containing reaction mixture of diiodinated difunctional oligomers (also referred to as telechelic diiodinated oligomers) and vinyl silane may be used to form crosslinked polymeric films by casting. That is, the oligomers and vinyl silane will react to form a polymeric adduct. A film of the adduct is cast and hydrolysis occurs by exposure of the polymeric adduct in the film to the acid catalyst or traces of acid in the air contacting the film. Alternatively, excess vinyl alkoxysilane and solvent may be removed by evaporation to yield the fluorosilicon polymer product. The product may be dried at room temperature or in an oven, generally at a temperature of up to 70° C.-120° C. Preferably the drying step takes place in an oven under an inert atmosphere.

Fluorosilicon elastomers prepared according to the process of the invention can be used to prepare articles such as flexible tubes, hose, o-rings, gaskets and other rubber articles, especially for applications that where exposure to extreme conditions is encountered, for example at temperatures below −20° C. The polymers are particularly useful to form items for automotive and aerospace applications, such as seals, o-rings, gaskets, and diaphragms.

EXAMPLES

Test Methods

Number average molecular weight (Mn) was determined by size exclusion chromatography (SEC). Samples were dissolved in tetrahydrofuran (THF). Analyses were performed with a Spectra-Physics chromatograph equipped with two PLgel 5 μm Mixed-C columns from Polymer Laboratories and a Spectra Physics SP8430 Refractive Index (RI) and UV detectors (the signals assigned to $PVF_2$—Is gave negative values in Refractive Index). Dimethylformamide (DMF) or THF were used as eluents at temperature=70° C. and at temperature=30° C., respectively, with a flow rate of 0.8 mL min$^{-1}$). Standards were monodispersed poly(styrene) (PS), purchased from Polymer Laboratories or other vendors. $^{19}F$ NMR with endgroup integration was also employed to check Mn and microstructure of the poly(VDF-co-PMVE) copolymers.

Glass transition temperature (Tg) was determined by differential scanning calorimetry (DSC). DSC measurements were conducted using a Perkin Elmer Pyris 1 instrument. Each sample (approximately 10 mg) was initially cooled to a temperature of −105° C. for 10 minutes, then heated from −100° to 50° C. at a heating rate of 20° C./minute. The sample was then cooled to −105° and the cycle was repeated. Values reported were obtained after a second heating. The values of $T_g$ reported correspond to the inflection point in the DSC curve.

Decomposition temperature (Td) was determined by thermal gravimetric analysis (TGA). TGA was performed with a Texas Instrument ATG 51-133 apparatus in air at the heating rate of either 10° or 20° C./minute from room temperature up to a maximum 550° C. TGA was also used to determine $T_{10}$ which represents the temperature at which the sample has lost 10% of its weight.

Example 1

Preparation of Iodinated Oligomer A

Deoxygenated water (400 mL), sodium persulfate (1.84 g) and 1,4-diiodoperfluorobutane (35.75 g) were charged to a one-liter reactor. The reactor was sealed, cooled to −40° C. and evacuated. The following monomers were then transferred to the reactor: perfluoro(methyl vinyl ether) (PMVE, 83 g) and vinylidene fluoride ($VF_2$, 48 g). The reactor was again sealed and the reaction mixture was slowly heated to 80° C. over a period of approximately one hour. The reaction was allowed to proceed at a temperature of 80° C. for 8 hrs. After cooling, the reactor contents were recovered and twice extracted with Vertrel®-XF solvent [2,3-dihydroperfluoropentane] (available from DuPont). The extracts were combined and washed with water to remove any sodium salt residue. The solution was further dried over sodium sulfate powder to eliminate water. The solvent was removed by rotary evaporation, followed by high vacuum. 50 grams of clear, colorless viscous liquid iodinated Oligomer A was obtained.

The composition of Iodinated Oligomer A was determined to be 71.8/28.2 (mol %) $VF_2$/PMVE by $^{19}F$-NMR in acetone-d6. The glass transition temperature of this oligomer was determined to be −58° C. by DSC, and the Mn was determined to be approximately 2,490 g/mol (polydispersity 1.126) by SEC in tetrahydrofuran using polystyrene as a standard.

Preparation of Silicon-containing Polymeric Adduct 1

Iodinated Oligomer A was reacted with triethoxyvinylsilane as follows. Iodinated Oligomer A (10 g; 0.004 mole), triethoxyvinylsilane (1.90 g; 0.01 mole) and tert-butylperoxy pivalate (0.2 g; 0.0012 mole) were dissolved in an amount of acetonitrile approximately four times the weight of the iodinated oligomer in a 200 ml. round bottom flask. The acetonitrile had been previously dried over sodium sulfate. The solution was purged with argon for 5 minutes to remove residual oxygen. The temperature of the reaction mixture was raised to 74±3° C. while agitating the reaction mixture. Reaction was allowed to proceed for 9 hours. A silicon-containing adduct, Silicon-containing Polymer Adduct 1, was formed. Solvent was evaporated from the reaction mixture by rotary evaporation and unreacted triethoxyvinylsilane was removed under high vacuum. The product was characterized by $^1H$ and $^{19}F$ NMR. $^1H$ NMR (ppm): 0.5 ($CH_3$ on Si and $CH_2Si(OEt)_3$); 1.2 ($CH_3$ in $Si(OEt)_3$); 2.9-3.2 ($CH_2$ of VDF); $\overline{3.4}$ ($CH_2$ in Si $(O\overline{Et})_3$); 3.7 (CHI); absence of signals in the 5.5-$\overline{6.5}$ ppm (assigned to eth$\overline{yl}$enic protons).

$^{19}F$ NMR (ppm): absence of signal at −39 ppm (assigned to $CH_2CF_2I$); −53 ($OCF_3$ of PMVE); −92 ($CH_2$ of normal VDF addition); −111 ($CF_2$ in $CH_2CF_2CF_2CF(OCF_3)$); −113 and −116 quasi negligible ($CH_2C\overline{F_2}$—$CF_2CH_2$); −118 to −122 (CF2 of PMVE and of chain $\overline{\text{transfer}}$ agent); −127 (CF in PMVE next to VDF); −146.0 (—$CF(OCF_3)$— of PMVE to a reversed VDF unit).

Preparation of Crosslinked Fluorinated Polymer

Silicon-containing Polymeric Adduct 1 (2.0 g, 8×10$^{-4}$ mole), methanesulfonic acid (0.015 g; 1.6×10$^{-4}$ s) and tetrahydrofuran (0.585 g) were agitated until a solution was formed. A thin film was cast from the solution. The film was held at ambient temperature for several hours during which time tetrahydrofuran evaporated and crosslinking occurred. The crosslinked fluoropolymer film had $T_g$ of −30° C. and $T_{10}$ of 290° C.

Example 2

Silicon-containing Polymeric Adduct 1 (2.0 g; 8×10$^{-4}$ mole), hydrochloric acid (0.2 g; 1×10$^{-4}$ mole), tetraethoxysilane (0.2 g; 1×10$^{-4}$ mole), and tetrahydrofuran (1.0 g) were agitated until a solution was formed. A 2 to 3 mm thick film was cast from the solution. The film was held at ambient temperature for several hours during which time tetrahydrofuran evaporated and crosslinking occurred. The crosslinked fluoropolymer film had T$_g$ of −15° C. and T$_{10}$ of 300° C.

$^{29}$Si Solid state NMR: T$_o$ (4.6%); T$_1$ (11.4%); T$_2$ (36.8%); T$_3$ (36.0%); Q$_3$ (5.8%); Q$_4$ (5.4%). Swelling rates: in ethanol at room temperature (RT) for 24 hrs (12%); in acetone at RT for 24 hrs (11%); in n-octane at RT for 24 hrs (0%); in n-octane at 60° C. for 24 hrs (1%).
Loss of 1 wt % at 400° C. under air.

Example 3

Preparation of Silicon-containing Polymeric Adduct 2

Iodinated Oligomer A was reacted with diethoxyvinylmethylsilane generally according to the procedure described above for preparation of Silicon-containing Polymeric Adduct 1. The reactants were as follows: Iodinated Oligomer A (10 g; 0.004 mole), diethoxyvinylmethylsilane (1.6 g; 0.01 mole) and tert-butylperoxy pivalate (0.2 g; 0.0012 mole). Approximately 30 g dried acetonitrile was used as the solvent. A silicon-containing adduct, Silicon-containing Polymer Adduct 2, was formed. Solvent was evaporated from the reaction mixture by rotary evaporation and unreacted diethoxyvinylmethylsilane was removed under high vacuum. The product was characterized by $^1$H and $^{19}$F NMR.

$^1$H NMR (ppm): 0.5 (CH$_3$ on Si and CH$_2$SiCH$_3$(OEt)$_2$; 1.2 (CH$_3$ in CH$_2$SiCH$_3$(OEt)$_2$;); 2.9-3.2 (CH$_2$ of VDF); 3.4 (CH$_2$ in CH$_2$SiCH$_3$(OEt)$_2$); 3.7 (CHI); absence of signals in the 5.5-6.5 ppm (assigned to ethylenic protons).

$^{19}$F NMR (ppm): absence of signal at −39 ppm (assigned to CH$_2$CF$_2$I); −53 (OCF$_3$ of PMVE); −92 (CH$_2$ of normal VDF addition); −111 (CF$_3$ in CH$_2$CF$_2$CF$_2$CF(OCF$_3$)); −113 and −116 (CH$_2$CF$_2$—CF$_2$CH$_2$); −118 to −122 (CF2 of PMVE and of chain transfer agent)

Preparation of Crosslinked Fluorinated Polymer

Silicon-containing Polymeric Adduct 2 (2.0 g, 8×10$^{-4}$ mole), methanesulfonic acid (0.015 g; 1.6×10$^{-4}$ mole) and methyl ethyl ketone (0.585 g) were agitated until a solution was formed to form Casting Mixture 3. A thin film was immediately cast from this casting mixture. The film was held at ambient temperature for several hours during which time methyl ethyl ketone evaporated and crosslinking occurred. The crosslinked film had T$_g$ of −28° C. and T$_{10}$ of 310° C. Swelling rates: in n-octane at room temperature for 24 hrs (1%); in n-octane at 60° C. for 24 hrs (2%). Loss of 2.5 wt % at 200° C. after 60° C. under air.

Example 4

Casting Mixture 3 of Example 3 was agitated at 60° C. for 60 minutes. A 2-3 mm thick film was then cast from the resultant mixture. The film was held at ambient temperature for several hours during which time methyl ethyl ketone evaporated and crosslinking occurred. The crosslinked film had T$_g$ of −28° C. and T$_{10}$ of 310° C. which were unchanged from the comparable physical property values of the crosslinked film of Example 3. Swelling rates in n-octane of the crosslinked film was 0% after 24 hours at room temperature and 0% after 24 hours at 60° C.

Example 5

Silicon-containing Polymeric Adduct 2 (2.0 g, 8×10$^{-4}$ mole), methanesulfonic acid (0.015 g; 1.6×10$^{-4}$ mole) and fumed silica (1.5 g) were mixed to form Casting Mixture 5. A thin film was immediately cast from this casting mixture. The film was held at ambient temperature for several hours. The crosslinked film had T$_g$ of −25° C. and T$_{10}$ of 307° C. Swelling rates in n-octane of the crosslinked film were 1% after 24 hours at room temperature and 2% after 24 hours at 60° C.

Example 6

Silicon-containing Polymeric Adduct 2 (2.0 g, 8×10$^{-4}$ mole), methanesulfonic acid (0.015 g; 1.6×10$^{-4}$ mole), tetraisopropyl titanate (0.023 g; 8×10$^{-5}$ mole) and methyl ethyl ketone (0.585 g) were agitated until dissolved at ambient temperature to form Casting Mixture 6. A thin film was immediately cast from this casting mixture. The film was held at ambient temperature for several hours. The crosslinked film had T$_g$ of −27° C. and T$_{10}$ of 310° C. Swelling rates in n-octane were 1% after 24 hours at room temperature and 2% after 24 hours at 60° C.

Example 7

Silicon-containing Polymeric Adduct 2 (2.0 g, 8×10$^{-4}$ mole), methanesulfonic acid (0.015 g; 1.6×10$^{-4}$ mole), tetraisopropyl titanate (0.023 g; 8×10$^{-5}$ mole) and methyl ethyl ketone (0.585 g) were agitated until completely mixed at 60° C. to form Casting Mixture 7. A 2-3 mm thick film was immediately cast from this casting mixture. The film was held at ambient temperature for several hours. The crosslinked film had T$_g$ of −30° C. and a T$_{10}$ of 300° C. Swelling rates were 8% in ethanol after 24 hours at room temperature and 91% in acetone after 24 hours at room temperature.

Example 8

Silicon-containing Polymeric Adduct 2 (2.0 g, 8×10$^{-4}$ mole), HSi(CH$_3$)$_2$O(CH$_3$)$_2$H (0.4 g; 3.2×10$^{-3}$ mole), and (pentafluorophenyl)lboron (0.016 g; 3.2×10$^{-5}$ mole) were agitated until completely mixed at ambient temperature to form Casting Mixture 8. A thin film was immediately cast from this casting mixture. The film was held at ambient temperature for several hours. The crosslinked film had T$_g$ of −47 and a T$_{10}$ of 305° C.

Example 9

Silicon-containing Polymeric Adduct 2 (2.0 g, 8×10$^{-4}$ mole), polydimethylsilane having a degree of polymerization of 100 (0.32 g; 4×10$^{-5}$ mole), triphenylboron (200 mg) and fumed silica (0.03 g) were agitated until completely mixed at ambient temperature to form Casting Mixture 9. A thin film was immediately cast from this casting mixture. The film was held at ambient temperature for several hours The crosslinked film had T$_g$ of −40 and a T$_{10}$ of 310° C. Swelling rates in n-octane were 0% after 24 hours at room temperature and 1% after 24 hours at 60° C.

Example 10

Preparation of Silicon-containing Polymeric Adduct 3

Iodinated Oligomer A was reacted with ethoxyvinyldimethylsilane generally according to the procedure described above for preparation of Silicon-containing Polymeric Adduct 1. The reactants were as follows: Iodinated Oligomer A (10 g; 0.004 mole), ethoxyvinyldimethylsilane (1.6 g; 0.01 mole) and tert-butylperoxy pivalate (0.2 g; 0.0012 mole). Approximately 30 g acetonitrile dried over sodium sulfate was used as the solvent. A silicon-containing adduct, Silicon-containing Polymer Adduct 3, was formed. Solvent was evaporated from the reaction mixture by rotary evaporation and unreacted ethoxyvinyldimethylsilane was removed under high vacuum. The product was characterized by $^1$H and $^{19}$F NMR.

$^1$H NMR (ppm): 0.5 (CH$_3$ on Si and CH$_2$Si(CH$_3$)$_2$OEt; 1.2 (CH$_3$ in CH$_2$Si(CH$_3$)$_2$OEt); 2.9-3.2 (CH$_2$ of VDF); 3.4 (CH$_2$ in CH$_2$Si(CH$_3$)$_2$OEt); 3.7 (CHI); absence of signals in the 5.5-6.5 ppm (assigned to ethylenic protons).

$^{19}$F NMR (ppm): absence of signal at −39 ppm (assigned to CH$_2$CF$_2$I); −53 (OCF$_3$ of PMVE); −92 (CH$_2$ of normal VDF addition); −111 (CF$_2$ in CH$_2$CF$_2$CF$_2$CF(OCF$_3$)); quasi absence of signals at −113 and −116 (CH$_2$CF$_2$—CF$_2$CH$_2$); −118 to −122 (CF2 of PMVE and of chain transfer agent); −127 (CF in PMVE next to VDF); −146.0 (—CF(OCF$_3$)— of PMVE next to a reversed VDF unit).

Preparation of Crosslinked Fluorinated Polymer

Silicon-containing Polymeric Adduct 2 (1.0 g, 4×10$^{-4}$ mole), Silicon-containing Polymeric Adduct 3 (1.0 g, 4×10$^{-4}$ mole) methanesulfonic acid (0.015 g; 1.6×10$^{-4}$ mole) and methyl ethyl ketone (0.585 g) were agitated for 60 minutes at 60° C. to form Casting Mixture 10. A thin film was immediately cast from the casting mixture. The film was held at ambient temperature for several hours during which time methyl ethyl ketone evaporated and crosslinking occurred. The crosslinked film had T$_g$ of −29° C. and T$_{10}$ of 300° C.

Example 11

Silicon-containing Polymeric Adduct 2 (1.6 g, 6.4×10$^{-4}$ mole), Silicon-containing Polymeric Adduct 3 (1.6 g, 6.4×10$^{-4}$ mole) methanesulfonic acid (0.015 g; 1.6×10$^{-4}$ mole) and methyl ethyl ketone (0.585 g) were agitated for 60 minutes at 60° C. to form Casting Mixture 11. A thin film was immediately cast from the casting mixture. The film was held at ambient temperature for several hours during which time methyl ethyl ketone evaporated and crosslinking occurred. The crosslinked film had T$_g$ of −28° C. and T$_{10}$ of 310° C. Swelling rates in n-octane of the crosslinked film were 2% after 24 hours at room temperature and 2% after 24 hours at 60° C.

Example 12

Silicon-containing Polymeric Adduct 2 (0.4 g, 1.6×10$^{-4}$ mole), Silicon-containing Polymeric Adduct 3 (1.6 g, 6×10$^{-4}$ mole), methanesulfonic acid (0.015 g; 1.6×10$^{-4}$ mole) and methyl ethyl ketone (0.585 g) were agitated for 60 minutes at 60° C. to form Casting Mixture 12. A thin film was immediately cast from the casting mixture. The film was held at ambient temperature for several hours during which time methyl ethyl ketone evaporated and crosslinking occurred. The crosslinked film had T$_g$ of −31° C. and T$_{10}$ of 300° C.

Example 13

Silicon-containing Polymeric Adduct 2 (1.0 g, 4×10$^{-4}$ mole), Silicon-containing Polymeric Adduct 3 (1.0 g, 4×10$^{-4}$ mole) and methanesulfonic acid (0.015 g; 1.6×10$^{-4}$ moles) were agitated to form Casting Mixture 13. A thin film was immediately cast from the casting mixture. The crosslinked film had T$_g$ of −35° C. and T$_{10}$ of 305° C. Swelling rates in n-octane of the crosslinked film were 1% after 24 hours at room temperature and 3% after 24 hours at 60° C.

Example 14

Silicon-containing Polymeric Adduct 2 (1.6 g, 6.4×10$^{-4}$ mole), Silicon-containing Polymeric Adduct 3 (0.4 g, 1.6×10$^{-4}$ mole) and methanesulfonic acid (0.015 g; 1.6×10$^{-4}$ mole) were agitated to form Casting Mixture 14. A thin film was immediately cast from the casting mixture. The crosslinked film had T$_g$ of −21° C. and T$_{10}$ of 305° C. Swelling rates in n-octane of the crosslinked film were 0% after 24 hours at room temperature and 2% after 24 hours at 60° C. Loss of 11 wt % after 2 hrs at 200° C. under air.

Example 15

Silicon-containing Polymeric Adduct 2 (0.4 g, 1.6×10$^{-4}$ mole), Silicon-containing Polymeric Adduct 3 (1.6 g, 6.4×10$^{-4}$ mole) and methanesulfonic acid (0.015 g; 1.6×10$^{-4}$ mole) were agitated to form Casting Mixture 15. A thin film was immediately cast from the casting mixture. The crosslinked film had T$_g$ of −31° C. and T$_{10}$ of 305° C.

Example 16

Silicon-containing Polymeric Adduct 2 (1.2 g, 4.8×10$^{-4}$ mole), Silicon-containing Polymeric Adduct 3 (0.8 g, 3.2×10$^{-4}$ mole) and methanesulfonic acid (0.015 g; 1.6×10$^{-4}$ mole) were agitated to form Casting Mixture 16. A thin film was immediately cast from the casting mixture. The crosslinked film had T$_g$ of −29° C. and T$_{10}$ of 305° C. Swelling rates in n-octane were 0% after 24 hours at room temperature and 2% after 24 hours at 60° C.).

Example 17

Silicon-containing Polymeric Adduct 2 (1.32 g, 5.28×10$^{-4}$ mole), Silicon-containing Polymeric Adduct 3 (0.72 g, 2.88×10$^{-4}$ mole) and methanesulfonic acid (0.015 g; 1.6×10$^{-4}$ mole) were agitated to form Casting Mixture 17. A thin film was immediately cast from the casting mixture. The crosslinked film had T$_g$ of −28° C. and T$_{10}$ of 310° C. Swelling rates in n-octane were 0% after 24 hours at room temperature and 2% after 24 hours at 60° C.).

What is claimed is:

1. A process for producing a crosslinked fluorinated polymer comprising the steps of:
   A) providing an iodinated oligomer consisting essentially of:
   1) 40 to 90 mole percent copolymerized units of a first monomer selected from the group consisting of vinylidene fluoride and tetrafluoroethylene;
   2) 10 to 60 mole percent copolymerized units of a second monomer of the formula CF$_2$=CFOR$_f$ where R$_f$ is a perfluoroalkylene group of 1-5 carbon atoms;
   3) 0 to 10 mole percent copolymerized units of a comonomer selected from the group consisting of hexafluoropropylene and tetrafluoroethylene, with the proviso that said comonomer can only be tetrafluoroethylene when said first monomer is vinylidene fluoride and said comonomer can only be hexafluoropropylene when said first monomer is tetrafluoroethylene;
   4) 0 to 10 mole percent copolymerized units of a perfluoro(vinyl ether) of formula CF$_2$=CFO(R$_f$O)$_n$(R$_{f'}$O)$_m$R$_{f'}$ where R$_f$ and R$_{f'}$ are different linear or branched perfluoroalkylene groups of 2-6 carbon atoms, m and n are independently 0-10, and $R_f$ is a perfluoroalkyl group of 1-6 carbon atoms, with the proviso that said perfluoro(vinyl ether) is different from said second monomer; and 5) 0 to 10 mole percent copolymerized units of a functional fluorovinyl ether selected from the group consisting of a functional fluorovinyl ether selected from the group consisting of
    a) propanoic acid, 3-[1-[difluoro[(1,2,2-trifluoroethenyl)oxy]methyl]-1,2,2,2-tetrafluoroethoxy]-2,2,3,3-tetrafluoro-, methyl ester;
    b) ethanesulfonyl fluoride, 2-[1-[difluoro[(1,2,2-trifluoroethenyl)oxy]methyl]-1,2,2,2-tetrafluoroethoxy]-1,1,2,2-tetrafluoro-;
    c) 1-propanol, 3-[1-[difluoro[(trifluoroethenyl)oxy]methyl]-1,2,2,2-tetrafluoroethoxy]-2,2,3,3-tetrafluoro-;
    d) propanenitrile, 3-[1-[difluoro[(1,2,2-trifluoroethenyl)oxy]methyl]-1,2,2,2-tetrafluoroethoxy]-2,2,3,3-tetrafluoro-;
    e) hexanenitrile, 2,2,3,3,4,4,5,5,6,6-decafluoro-6-[(1,2,2-trifluoroethenyl)oxy]-;
    f) propanenitrile, 2,3,3,3-tetrafluoro-2-[1,1,2,2,3,3-hexafluoro-3-[(trifluoroethenyl)oxy]propoxy]-;
    g) propanamide, 3-[1-[difluoro[(1,2,2-trifluoroethenyl)oxy]methyl]-1,2,2,2-tetrafluoroethoxy]-2,2,3,3-tetrafluoro-;
    h) 1-propanol, 3-[1-[difluoro[(trifluoroethenyl)oxy]methyl]-1,2,2,2-tetrafluoroethoxy]-2,2,3,3-tetrafluoro-, dihydrogen phosphate; and
    i) propanoic acid, 3-[1-[difluoro[(trifluoroethenyl)oxy]methyl]-1,2,2,2-tetrafluoroethoxy]-2,2,3,3-tetrafluoro-
wherein said diiodinated oligomer has a number average molecular weight of 1000 to 25,000 g/mole and wherein said oligomer has an iodine group at each chain end;

B) contacting said iodinated oligomer with a vinyl silane of the formula $$CH_2\!\!=\!\!CY\!\!-\!\!(CH_2)_n\!\!-\!\!SiRR'R''$$

where Y is a hydrogen atom or a $C_1$-$C_3$ alkyl group, R is a methoxy or ethoxy group, and R' and R'' are independently selected from the group consisting of methyl groups, methoxy groups and ethoxy groups, under conditions wherein the molar ratio to form a silicon-containing polymeric adduct that is a composition of the formula $$PC\!\!-\!\![CH_2CYI\!\!-\!\!(CH_2)_nSiRR'R'']_m$$

where PC is the polymer chain of said iodinated oligomer, n is 0-2 and m is 2; and C) contacting said silicon-containing polymeric adduct with an acid to form a crosslinked fluorinated polymer.

2. A process of claim 1 wherein the first monomer is vinylidene fluoride.

3. A process of claim 1 wherein the first monomer is tetrafluoroethylene.

4. A process of claim 1 wherein the second monomer perfluoromethyl vinyl ether.

5. A process of claim 1 wherein the mol ratio of iodinated oligomer to vinyl silane is 7.5-10.

6. A process of claim 1 wherein the acid utilized in step C is selected from the group consisting of methanesulfonic acid, triflic acid, paratoluenesulfonic acid, hydrochloric acid, nitric acid and sulfuric acid.

7. A process for producing a crosslinked fluorinated polymer comprising the steps of:

A) providing an iodinated oligomer consisting essentially of:
    1) 40 to 90 mole percent copolymerized units of a first monomer selected from the group consisting of vinylidene fluoride and tetrafluoroethylene;
    2) 10 to 60 mole percent copolymerized units of a second monomer of the formula $CF_2\!\!=\!\!CFOR_f$ where $R_f$ is a perfluoroalkylene group of 1-5 carbon atoms;
    3) 0 to 10 mole percent copolymerized units of a comonomer selected from the group consisting of hexafluoropropylene and tetrafluoroethylene, with the proviso that said comonomer can only be tetrafluoroethylene when said first monomer is vinylidene fluoride and said third monomer can only be hexafluoropropylene when said first monomer is tetrafluoroethylene;
    4) 0 to 10 mole percent copolymerized units of a perfluoro(vinyl ether) of the formula $CF_2\!\!=\!\!CFO(R_fO)_n(R_{f'}O)_mR_{f'}$ where $R_{f'}$ and $R_{f''}$ are different linear or branched perfluoroalkylene groups of 2-6 carbon atoms, m and n are independently 0-10, and $R_f$ is a perfluoroalkyl group of 1-6 carbon atoms, with the proviso that said perfluoro(vinyl ether) is different from said second monomer; and
    5) 0 to 10 mole percent copolymerized units of a functional fluorovinyl ether selected from the group consisting of a functional fluorovinyl ether selected from the group consisting of
        a) propanoic acid, 3-[1-[difluoro[(1,2,2-trifluoroethenyl)oxy]methyl]-1,2,2,2-tetrafluoroethoxy]-2,2,3,3-tetrafluoro-, methyl ester;
        b) ethanesulfonyl fluoride, 2-[1-[difluoro[(1,2,2-trifluoroethenyl)oxy]methyl]-1,2,2,2-tetrafluoroethoxy]-1,1,2,2-tetrafluoro-;
        c) 1-propanol, 3-[1-[difluoro[(trifluoroethenyl)oxy]methyl]-1,2,2,2-tetrafluoroethoxy]-2,2,3,3-tetrafluoro-;
        d) propanenitrile, 3-[1-[difluoro[(1,2,2-trifluoroethenyl)oxy]methyl]-1,2,2,2-tetrafluoroethoxy]-2,2,3,3-tetrafluoro-;
        e) hexanenitrile, 2,2,3,3,4,4,5,5,6,6-decafluoro-6-[(1,2,2-trifluoroethenyl)oxy]-;
        f) propanenitrile, 2,3,3,3-tetrafluoro-2-[1,1,2,2,3,3-hexafluoro-3-[(trifluoroethenyl)oxy]propoxy]-;
        g) propanamide, 3-[1-[difluoro[(1,2,2-trifluoroethenyl)oxy]methyl]-1,2,2,2-tetrafluoroethoxy]-2,2,3,3-tetrafluoro-;
        h) 1-propanol, 3-[1-[difluoro[(trifluoroethenyl)oxy]methyl]-1,2,2,2-tetrafluoroethoxy]-2,2,3,3-tetrafluoro-, dihydrogen phosphate; and
        i) propanoic acid, 3-[1-[difluoro[(trifluoroethenyl)oxy]methyl]-1,2,2,2-tetrafluoroethoxy]-2,2,3,3-tetrafluoro-
    wherein said iodinated oligomer has a number average molecular weight of 1000 to 25,000 g/mole and wherein said oligomer has an iodine group at each chain end;

B) contacting said iodinated oligomer with a vinyl silane of the formula $$CH_2\!\!=\!\!CY\!\!-\!\!(CH_2)_n\!\!-\!\!SiRR'R''$$

where Y is a hydrogen atom or a $C_1$-$C_3$ alkyl group, R is a methoxy or ethoxy group, and R' and R'' are independently selected from the group consisting of methyl groups, methoxy groups and ethoxy groups, under conditions wherein the molar ratio of said iodinated oligomer to said vinyl silane is 1 to at least 2.5 to form a silicon-containing polymeric adduct that is a composition of the formula PC—[CH$_2$CYI—(CH$_2$)$_n$SiRR'R"]$_m$ where PC is the polymer chain of said iodinated oligomer, n is 0-2 and m is 2;

C) contacting said silicon-containing polymeric adduct with a reducing agent to form a non-iodinated silicon-containing polymeric adduct; and D) contacting said non-iodinated silicon-containing polymeric adduct with an acid to form a crosslinked fluorinated polymer.

8. A process of claim 7 wherein the first monomer is vinylidene fluoride.

9. A process of claim 7 wherein the first monomer is tetrafluoroethylene.

10. A process of claim 7 wherein the second monomer perfluoromethyl vinyl ether.

11. A process of claim 7 wherein the molar ratio of iodinated oligomer to vinyl silane is 1 to 7.5-10.

12. A process of claim 7 wherein the acid utilized in step C is selected from the group consisting of methanesulfonic acid, triflic acid, paratoluenesulfonic acid, hydrochloric acid, nitric acid and sulfuric acid.

13. A process of claim 7 wherein the reducing agent is selected from the group consisting of tributyltin hydride, zinc in non-protonic solvents, lithium aluminum hydride, sodium borohydride, sodium amalgams, diborane and hydrogen over a catalyst.

* * * * *

UNITED STATES PATENT AND TRADEMARK OFFICE
CERTIFICATE OF CORRECTION

PATENT NO. : 8,138,274 B2
APPLICATION NO. : 12/632982
DATED : March 20, 2012
INVENTOR(S) : Ming-Hong Hung and Bruno Ameduri Page 1 of 1

It is certified that error appears in the above-identified patent and that said Letters Patent is hereby corrected as shown below:

Column 12, line 37, in Example 8, replace "$HSi(CH_3)_2O(CH_3)_2H$" with --$HSi(CH_3)_2O(CH_3)_2SiH$--

Column 12, line 38, in Example 8, replace "(pentafluorophenyl)lboron" with --(pentafluorophenyl) boron--

Column 12, line 49, in Example 9, replace "triphenylboron" with --(pentafluorophenyl) boron--

Signed and Sealed this
Sixteenth Day of October, 2012

David J. Kappos
*Director of the United States Patent and Trademark Office*